United States Patent
Kang et al.

(10) Patent No.: US 8,894,380 B2
(45) Date of Patent: Nov. 25, 2014

(54) RECIPROCATING COMPRESSOR

(75) Inventors: Yang-Jun Kang, Changwon-si (KR);
Chan-Gab Park, Changwon-si (KR);
Young-Hoan Jeon, Changwon-si (KR);
Kyoung-Seok Kang, Changwon-si (KR)

(73) Assignee: LG Electronics Inc., Seoul (KR)

( * ) Notice: Subject to any disclaimer, the term of this patent is extended or adjusted under 35 U.S.C. 154(b) by 992 days.

(21) Appl. No.: 12/739,065

(22) PCT Filed: Oct. 20, 2008

(86) PCT No.: PCT/KR2008/006195
§ 371 (c)(1),
(2), (4) Date: Nov. 19, 2010

(87) PCT Pub. No.: WO2009/054654
PCT Pub. Date: Apr. 30, 2009

(65) Prior Publication Data
US 2011/0058968 A1    Mar. 10, 2011

(30) Foreign Application Priority Data
Oct. 24, 2007    (KR) .................. 10-2007-0107339
Oct. 17, 2008    (KR) .................. 10-2008-0102213

(51) Int. Cl.
*F04B 47/06* (2006.01)
*F04B 35/04* (2006.01)
*F04B 17/04* (2006.01)
*F04B 49/12* (2006.01)
*H02P 25/02* (2006.01)
*F04B 49/16* (2006.01)

(52) U.S. Cl.
CPC .............. *F04B 35/04* (2013.01); *F04B 35/045* (2013.01); *F04B 17/04* (2013.01); *F04B 49/12* (2013.01); *H02P 25/027* (2013.01); *F04B 49/16* (2013.01)

USPC ........................................ 417/44.11; 417/417

(58) Field of Classification Search
USPC .............. 417/44.1, 45, 44.11, 415, 416, 417, 417/418, 902
See application file for complete search history.

(56) References Cited

U.S. PATENT DOCUMENTS

| 5,980,211 A | 11/1999 | Tojo et al. |
| 2005/0158178 A1 | 7/2005 | Yoo et al. |

FOREIGN PATENT DOCUMENTS

| WO | WO 2006/025619 | 3/2006 | |
| WO | WO2006-025619 | * 3/2006 | ............. H02K 33/10 |
| WO | WO2006025618 | * 3/2006 | ............. H02K 33/10 |
| WO | WO 2007/049875 | 5/2007 | |
| WO | WO 2007/089083 | 8/2007 | |

OTHER PUBLICATIONS

International Search Report issued in PCT/KR2008/006195 dated Apr. 6, 2010.
European Search Report dated Feb. 11, 2011 for Application No. 08842366.0.
* cited by examiner

*Primary Examiner* — Bryan Lettman
(74) *Attorney, Agent, or Firm* — Ked & Associates LLP

(57) ABSTRACT

A reciprocating compressor is provided that reciprocates a piston inside a cylinder as a linear motor is driven, to compress a refrigerant by sucking the refrigerant into a compression space between the cylinder and the piston, and then discharge the same. The piston is operated at a top dead center position and in a resonance state by symmetrically applying a voltage even if a load varies. An elastic coefficient of mechanical spring is set in consideration of a degree of shift of the piston influenced by gas springs varied by the load, and an initial value of the piston to maintain stroke of the piston is set so as to correspond to a required cooling capacity condition.

14 Claims, 4 Drawing Sheets

RECIPROCATING COMPRESSOR

TECHNICAL FIELD

The present invention relates to a reciprocating compressor, which compresses a refrigerant while a piston elastically supported by mechanical springs and gas springs linearly reciprocates in a cylinder, and more particularly, to a reciprocating compressor, which moves a piston at a top dead center and induces a resonance motion of the piston by symmetrically applying voltages even if the load is varied.

BACKGROUND ART

In general, a compressor is a mechanical apparatus for compressing the air, refrigerant or other various operation gases and raising a pressure thereof, by receiving power from a power generation apparatus such as an electric motor or turbine. The compressor has been widely used for an electric home appliance such as a refrigerator and an air conditioner, or in the whole industry.

The compressors are roughly classified into a reciprocating compressor in which a compression space for sucking or discharging an operation gas is formed between a piston and a cylinder, and the piston is linearly reciprocated inside the cylinder, for compressing a refrigerant, a rotary compressor in which a compression space for sucking or discharging an operation gas is formed between an eccentrically-rotated roller and a cylinder, and the roller is eccentrically rotated along the inner wall of the cylinder, for compressing a refrigerant, and a scroll compressor in which a compression space for sucking or discharging an operation gas is formed between an orbiting scroll and a fixed scroll, and the orbiting scroll is rotated along the fixed scroll, for compressing a refrigerant.

Recently, a linear compressor which can improve compression efficiency and simplify the whole stricture without a mechanical loss resulting from motion conversion by connecting a piston directly to a linearly-reciprocated driving motor has been popularly developed among the reciprocating compressors.

FIG. 1 is a side cross sectional view showing a conventional reciprocating compressor. In the reciprocating compressor, an inlet tube 2a and an outlet tube 2b through which refrigerants are sucked and discharged are installed at one side of a closed vessel 2, a cylinder 4 is fixedly installed inside the closed vessel 2, a piston 6 is installed inside the cylinder 4 to be linearly reciprocated to compress the refrigerants sucked into a compression space P in the cylinder 4, and various springs are installed to be elastically supported in the motion direction of the piston 6. Here, the piston 6 is connected to a linear motor 10 for generating a linear reciprocation driving force.

In addition, a suction valve 22 is installed at one end of the piston 6 contacting the compression space P, and a discharge valve assembly 24 is installed at one end of the cylinder 4 contacting the compression space P. The suction valve 22 and the discharge valve assembly 24 are automatically controlled to be opened or closed according to the inside pressure of the compression space P, respectively.

The top and bottom shells of the closed vessel 2 are coupled to hermetically seal the closed vessel 2. The inlet tube 2a through which the refrigerants are sucked and the outlet tube 2b through which the refrigerants are discharged are installed at one side of the closed vessel 2. The piston 6 is installed inside the cylinder 4 to be elastically supported in the motion direction to perform the linear reciprocation. The linear motor 10 is connected to a frame 18 outside the cylinder 4. The cylinder 4, the piston 6 and the linear motor 10 compose an assembly. The assembly is installed on the inside bottom surface of the closed vessel 2 to be elastically supported by a support spring 29.

The inside bottom surface of the closed vessel 2 contains oil, an oil supply device 30 for pumping the oil is installed at the lower end of the assembly, and an oil supply tube 18a for supplying the oil between the piston 6 and the cylinder 4 is formed inside the frame 18 at the lower side of the assembly. Accordingly, the oil supply device 30 is operated by vibrations generated by the linear reciprocation of the piston 6, for pumping the oil, and the oil is supplied to the gap between the piston 6 and the cylinder 4 along the oil supply tube 18a, for cooling and lubrication.

The cylinder 4 is formed in a hollow shape so that the piston 6 can perform the linear reciprocation, and has the compression space P at its one side. Preferably, the cylinder 4 is installed on the same straight line with the inlet tube 2a in a state where one end of the cylinder 4 is adjacent to the inside portion of the inlet tube 2a.

The piston 6 is installed inside one end of the cylinder 4 adjacent to the inlet tube 2a to perform linear reciprocation, and the discharge valve assembly 24 is installed at one end of the cylinder 4 in the opposite direction to the inlet tube 2a.

Here, the discharge valve assembly 24 includes a discharge cover 24a for forming a predetermined discharge space at one end of the cylinder 4, a discharge valve 24b for opening or closing one end of the cylinder 4 near the compression space P, and a valve spring 24c which is a kind of coil spring for applying an elastic force between the discharge cover 24a and the discharge valve 24b in the axial direction. An O-ring R is inserted onto the inside circumferential surface of one end of the cylinder 4, so that the discharge valve 24a can be closely adhered to one end of the cylinder 4.

An indented loop pipe 28 is installed between one side of the discharge cover 24a and the outlet tube 2b, for guiding the compressed refrigerants to be externally discharged, and preventing vibrations generated by interactions of the cylinder 4, the piston 6 and the linear motor 10 from being applied to the whole closed vessel 2.

Therefore, when the piston 6 is linearly reciprocated inside the cylinder 4, if the pressure of the compression space P is over a predetermined discharge pressure, the valve spring 24c is compressed to open the discharge valve 24b, and the refrigerants are discharged from the compression space P, and then externally discharged along the loop pipe 28 and the outlet tube 2b.

A refrigerant passage 6a through which the refrigerants supplied from the inlet tube 2a flows is formed at the center of the piston 6. The linear motor 10 is directly connected to one end of the piston 6 adjacent to the inlet tube 2a by a connection member 17, and the suction valve 22 is installed at one end of the piston 6 in the opposite direction to the inlet tube 2a. The piston 6 is elastically supported in the motion direction.

The suction valve 22 is formed in a thin plate shape. The center of the suction valve 22 is partially cut to open or close the refrigerant passage 6a of the piston 6, and one side of the suction valve 22 is fixed to one end of the piston 6a by screws.

Accordingly, when the piston 6 is linearly reciprocated inside the cylinder 4, if the pressure of the compression space P is below a predetermined suction pressure lower than the discharge pressure, the suction valve 22 is opened so that the refrigerants can be sucked into the compression space P, and if the pressure of the compression space P is over the predetermined suction pressure, the refrigerants of the compression space P are compressed in the close state of the suction valve 22.

Especially, the piston 6 is installed to be elastically supported in the motion direction. In detail, a piston flange 6b protruded in the radial direction from one end of the piston 6 adjacent to the inlet tube 2a is elastically supported in the motion direction of the piston 6 by mechanical springs 8a and 8b such as coil springs. The refrigerants included in the compression space P in the opposite direction to the inlet tube 2a are operated as gas spring due to an elastic force, thereby elastically supporting the piston 6.

Here, the mechanical springs 8a and 8b have constant mechanical spring constants $K_m$ regardless of the load, and are preferably installed side by side with a support frame 26 fixed to the linear motor 10 and the cylinder 4 in the axial direction from the piston flange 6b. Also, preferably, the mechanical spring 8a supported by the support frame 26 and the mechanical spring 8a installed on the cylinder 4 have the same mechanical spring constant $K_m$.

The linear motor 10 includes an inner stator 12 formed by stacking a plurality of laminations 12a in the circumferential direction, and fixedly installed outside the cylinder 4 by the frame 18, an outer stator 14 formed by stacking a plurality of laminations 14b at the periphery of a coil wound body 14a in the circumferential direction, and installed outside the cylinder 4 by the frame 18 with a predetermined gap from the inner stator 12, and a permanent magnet 16 positioned at the gap between the inner stator 12 and the outer stator 14, and connected to the piston 6 by the connection member 17. Here, the coil wound body 14a can be fixedly installed outside the inner stator 12.

In the linear motor 10, when a current is applied to the coil wound body 14a to generate an electromagnetic force, the permanent magnet 16 is linearly reciprocated by interactions between the electromagnetic force and the permanent magnet 16, and the piston 6 connected to the permanent magnet 16 is linearly reciprocated inside the cylinder 4.

In such a reciprocating compressor, the operation frequency is controlled to be synchronized with the resonance frequency so that the reciprocating compressor can be operated in the resonance state. The resonance frequency is defined as $$f = f_m = \frac{1}{2\pi} \cdot \sqrt{\frac{k_m + k_g}{m}}.$$

Here, km represents the elastic coefficient of the mechanical springs, kg represents the elastic coefficient of the gas springs, and m represents the mass of the linearly reciprocating piston and a member connected thereto. Therefore, the resonance frequency is influenced by the elastic coefficient of the gas springs varied by load, as well as by the elastic coefficient of the mechanical springs, which is a constant. Hence, in the conventional reciprocating compressor, the elastic coefficient of the mechanical springs are set relatively larger than the elastic coefficient of the gas springs to such a degree as to ignore the elastic coefficient of the gas springs in order to easily synchronize the operation frequency with the resonance frequency under low load condition.

The reciprocating compressor used in a cooling system is controlled so as to adjust the flow rate in accordance with a required cooling capacity corresponding to load. The flow rate of the compressor is defined as Q=C×(A×S×f). Here, C represents a proportional constant, A represents a cross-sectional area of the piston, S represents a stroke of the piston which is a reciprocating distance of the piston, and f represents an operation frequency of the piston. Accordingly, in order to adjust the flow rate in accordance with the cooling rapacity corresponding to load, the conventional reciprocating compressor is controlled so that the stroke S of the piston can be increased while approaching to synchronize the operation frequency with the resonance frequency. At this time, when the piston is operated to reach a top dead center operation, in which the head of the piston is consistent with one surface of the cylinder under resonance condition, the gas springs are nonlinearly jumped by a change in input voltage, thereby bringing about an instability phenomenon where the stroke is excessively varied. By using this instability phenomenon, the operation frequency for top dead center operation in the resonance state is determined.

In the above-described conventional reciprocating compressor, the elastic coefficient of the mechanical springs is set larger than the elastic coefficient of the gas springs in order to control the compressor to undergo a resonance operation under low load condition, and, as a result, the shift of the piston is small under overload condition. Hence, even if the piston is operated to reach a top dead center position by synchronizing the operation frequency with the resonance frequency, a sufficient stroke of the piston cannot be generated. Therefore, the conventional reciprocating compressor is controlled to be operated by artificially increasing the stroke of the piston by using asymmetrical logic in place of the top dead center operation that is performed in the resonance state.

FIG. 2 is a view for explaining a method for operating a reciprocating compressor under a load condition according to the conventional art. Referring to FIGS. 1 and 2, when no power is applied to the coil wound body 14a of the linear motor 14 and there is no external force, the distance between one surface of the cylinder 4 constituting the compression space P and the head of the piston 6 (hereinafter, the initial value of the piston) is denoted by $X_i$.

Under the low load condition, since the ambient temperature is relatively low, the volume of the refrigerant present in the compression space P of the cylinder 4 is relatively small. Thus, there exists no shift of the piston 6 caused by the refrigerant, thereby keeping the initial value $X_i$ of the piston 6 constant.

Accordingly, under the low load condition, a voltage is supplied to have a symmetrical amplitude in order to maintain the stroke of the piston 6 so that the piston 6 can be operated to reach the top dead center (TDC) with respect to the initial value $X_i$ of the head of the piston 6. That is, if the head of the piston 6 is closer to one surface of the cylinder 4 than the initial value $X_i$, a voltage is supplied which has such an amplitude as to make the head of the piston 6 contact with the one surface of the cylinder 4. On the other hand, if the head of the piston 6 is farther from one surface of the cylinder 4 than the initial value $X_i$, a voltage is supplied which has an amplitude symmetrical to that when the head of the piston 6 is closer to one surface of the cylinder 4 than the initial value $X_i$.

Under the overload condition, since the ambient temperature is relatively high, the volume of the refrigerant in the compression space P of the cylinder 4 is relatively small. Thus, there exists a shift of the piston 6 caused by the refrigerant, thereby varying the initial value $X_i$ of the piston 6 by the shift of the piston 6.

Accordingly, under the high load condition, a voltage is supplied to have an asymmetrical amplitude in order to maintain the stroke of the piston 6 so that the piston 6 can be operated to reach the top dead center (TDC) with respect to the initial value $X_i$ of the head of the piston 6. That is, if the head of the piston 6 is closer to one surface of the cylinder 4 than the initial value $X_i$, a voltage having the same amplitude as that in the low load state. On the other hand, if the head of the piston 6 is farther from one surface of the cylinder 4 than the initial value $X_i$, a voltage having an amplitude larger than that in the low load state by $\beta(\beta \geq 1)$ is supplied. Of course, it is apparent to those skilled in the art that if a voltage is asymmetrically applied under the overload condition, when the distance between one surface of the cylinder 4 and the head of the piston 6 is farther than the initial value $X_i$, the movement distance of the piston 6 is increased by $\beta$ compared to the movement distance of the piston 6 in the low load state. In this way, the flow rate was adjusted by adjusting the stroke of the piston 6 according to load.

DISCLOSURE OF INVENTION

Technical Problem

The above-described conventional reciprocating compressor uses an asymmetrical logic in order to artificially increase the stroke of the piston. However, since the switch is always kept in the on state to make currents flow, a loss caused by direct current is always generated. Further, even if a product using a compressor is in the off state, the switch at the compressor has to maintain the on state, thereby reducing efficiency.

Furthermore, in the conventional reciprocating compressor, there is no instability phenomenon caused by a top dead center operation in the resonance state and the piston cannot be operated to reach the top dead center. Hence, the stroke of the piston is measured by a displacement sensor (LVDT) under a load condition in which asymmetricity is applied, and the asymmetric rate $\beta$ of supply voltage is set so that the piston can maintain a stroke that can provide sufficient cooling capacity under load condition, thereby making the tuning operation complicated and inconvenient.

Technical Solution

Accordingly, it is an object of the present invention to provide a reciprocating compressor which can increase a stroke S by a symmetrical voltage input and hence adjust the flow rate to a required level by selecting the elastic coefficient or initial value of springs and shifting a piston by a force applied by gas.

It is another object of the present invention to provide a reciprocating compressor which can perform power consumption for inspection in all of loads areas of a refrigerator by controlling the frequency of a symmetrical power applied to a coil and controlling the piston so as to be moved at a top dead center position.

To achieve the above objects, there is provided a reciprocating compressor in accordance with one aspect of the present invention, comprising: a closed vessel; a cylinder installed inside the closed vessel; a linear motor for linearly reciprocating the piston; a control unit for applying a symmetrical voltage to the linear motor; a gas spring for elastically supporting the piston in the motion direction by a refrigerant gas filled inside the closed vessel; and a mechanical spring for elastically supporting the piston in the motion direction, and having an elastic coefficient for allowing the piston to perform both of top dead center operation and resonance operation even if the load condition is varied.

Additionally, the elastic coefficient of the mechanical spring is set so that the piston can be symmetrically reciprocated with respect to the center point in consideration of the degree of shift of the piston in accordance with a load condition.

Additionally, the initial value of the piston is set so that the piston can be symmetrically reciprocated with respect to the center point in consideration of the degree of shift of the piston in accordance with a load condition.

Additionally, the elastic coefficient of the mechanical spring and the initial value of the piston are set in accordance with a maximum load condition.

Additionally, the control unit applies a voltage so that the stroke (S) of the piston and an operation frequency (f) map can be set in accordance with a required cooling capacity determined according to a load condition and the piston can be operated with the stroke (S) and operation frequency (f) in accordance with the required cooling capacity on the basis of the map.

Additionally, the control unit operates the piston at the top head center by adjusting an operation frequency (f) and an input voltage (V) so that the difference in phase between the stroke (S) of the piston and a current (A) can be the smallest.

To achieve the above objects, there is provided a reciprocating compressor in accordance with another aspect of the present invention, comprising: a closed vessel; a cylinder installed inside the closed vessel; a linear motor for linearly reciprocating the piston; a control unit for applying a symmetrical voltage to the linear motor; a gas spring for elastically supporting the piston in the motion direction by a refrigerant gas filled inside the closed vessel; and a mechanical spring for elastically supporting the piston in the motion direction, and having an elastic coefficient corresponding to the degree of shift of the piston for allowing the piston to perform a symmetrical reciprocating motion with respect to the center point even if the load condition is varied.

Additionally, the initial value of the piston is set to have an amplitude for maintaining the stroke of the piston so as to correspond to a required cooling capacity condition of the reciprocating compressor.

Additionally, the initial value of the piston and the stroke of the piston are set in consideration of the degree of shift of the piston under a maximum cooling capacity condition.

Additionally, the control unit performs a resonance operation of the piston at an operation frequency corresponding to the required cooling capacity condition of the reciprocating compressor and the stroke of the piston.

Additionally, the control unit moves the piston at a top dead center.

Additionally, the control unit moves the piston at a top dead center by making the difference in phase between the stroke (S) of the piston and a current (A) the smallest.

Advantageous Effects

The reciprocating compressor according to the present invention can increase a stroke S by a symmetrical voltage input and hence adjust the flow rate to a required level by selecting the elastic coefficient or initial value of springs and shifting a piston by a force applied by gas.

The reciprocating compressor according to the present invention can perform power consumption for inspection in all of loads areas of a refrigerator by controlling the frequency of a symmetrical power applied to a coil and controlling the piston so as to be moved at a top dead center position, and can provide a required cooling capacity by a simpler control.

BEST MODE FOR CARRYING OUT THE INVENTION

Figure 3:
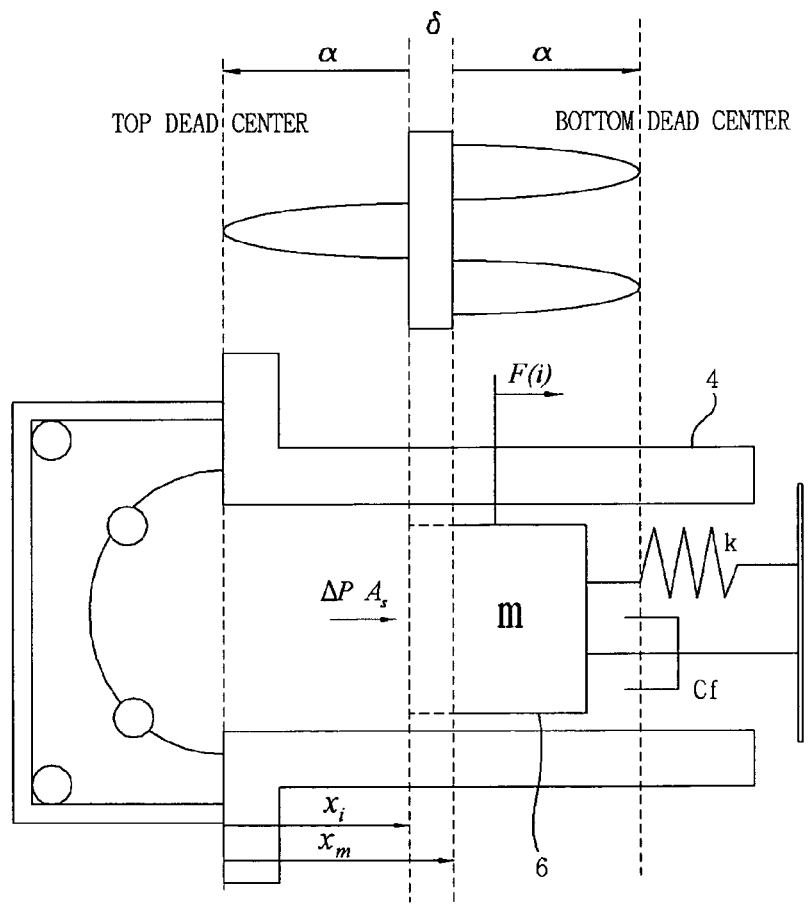
FIG. 3 is a view illustrating the operation and mechanical model of a piston of a reciprocating compressor according to the present invention.

FIG. 3 is a view illustrating the operation and mechanical model of a piston of a reciprocating compressor according to the present invention. Here, cc represents the distance the piston (6 of FIG. 1) is moved in one direction by applying a symmetrical voltage to a coil section (14a of FIG. 1) when no external force is applied, and δ represents the distance that the piston (6 of FIG. 1) is shifted by the force of the refrigerant being compressed. The upper part of FIG. 3 shows the movement of the piston briefly. In the present invention, when a voltage is symmetrically applied to the coil section (14a of FIG. 1) before an external force is applied, the piston (6 of FIG. 1) is moved, and the stroke of the piston becomes α+δ+α=2α=2δ+α. In the conventional art, if a voltage is asymmetrically applied, the stroke of the piston becomes α+δ+α×β=α(1+β)+δ, wherein β represents an asymmetric rate generated when the stroke of the piston is artificially changed as an asymmetrical voltage is applied to the coli section (14a of FIG. 1) under an overload condition. At this time, in the present invention, when an asymmetrical voltage is applied (β=1), the stroke of the piston becomes $2\alpha_1+\delta_1=\alpha_2(1+\beta)+\delta_2$ under the condition that the stroke of the piston is the same as that obtained when an asymmetrical voltage is applied according to the conventional art (β>1). In the present invention, it is apparent that, if the shift of the piston has a value of $\delta_1=\alpha_2(1+\beta)-2\alpha_1+\delta_2$, the same effect as the adjustment of the stroke of the piston by asymmetrically applying a voltage in the conventional art can be provided even if a symmetrical voltage is applied in the present invention.

The motion of the piston is mathematically described below. If a displacement from the cylinder (4 of FIG. 1) to the head of the piston (6 of FIG. 1) is x, the following Math Figure is established.

MathFigure 1

$$m\ddot{x}+c_x\dot{x}+k(x-x_i)=F(i)+\Delta P \cdot A_s \qquad [\text{Math.1}]$$

wherein $X_i$ is an initial value of the piston, F(i) is an external force, $\Delta P \cdot A_s$ is a force applied by the refrigerant. If x(t) is assumed to be $X_m+u(t)$ and substituted into Math Figure 1, the following Math Figure is established.

MathFigure 2

$$m\ddot{u}+c_f\dot{u}+k(u+x_m-x_i)=F(i)+\Delta P \cdot A_s \qquad [\text{Math.2}]$$

Figure 1:
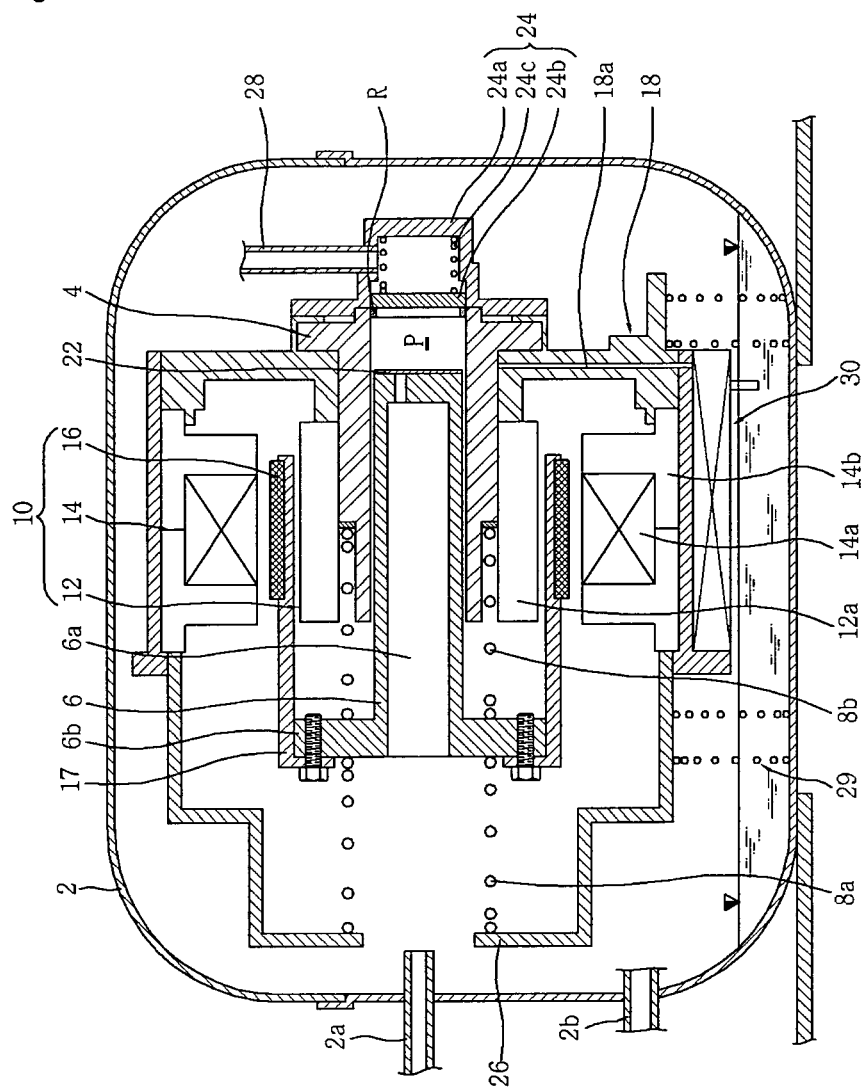
FIG. 1 is a side cross sectional view showing a conventional reciprocating compressor.
Figure 2:
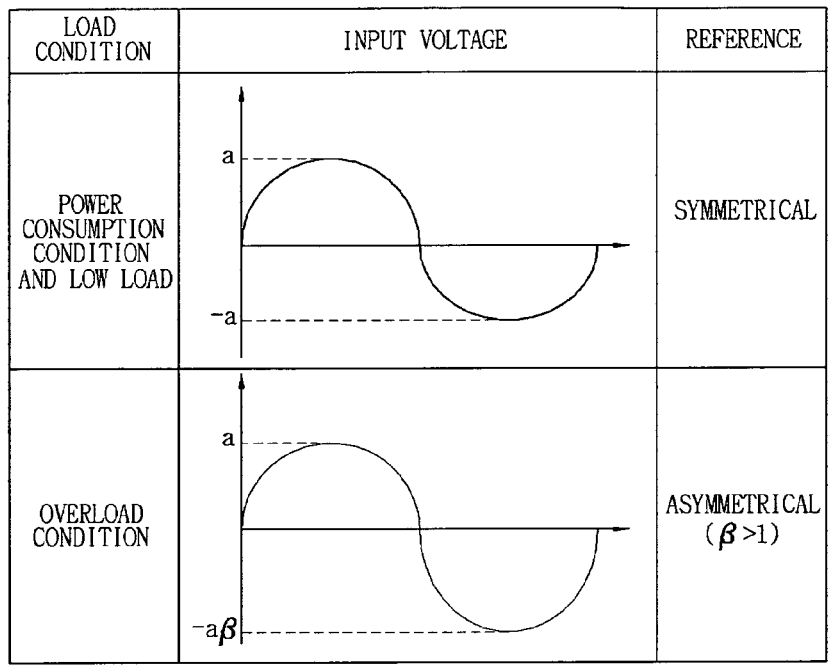
FIG. 2 is a view for explaining a method for operating a reciprocating compressor under a load condition according to the conventional art.

Here, $c_x$ in Math Figure 1 and $c_f$ in Math Figure 2 are equal to each other.

Here, if Math Figure 2 is divided into an AC component and a DC component, the following Math Figure is established.

MathFigure 3

$$m\ddot{u}+c_f\dot{u}+ku=F(i)$$

$$k(x_m-x_i)=\Delta P \cdot A_s \qquad [\text{Math.3}]$$

In a compressor included in the cooling cycle of a cooling apparatus, ΔP is the difference between a discharge pressure of the refrigerant discharged from the compressor and a suction pressure of the refrigerant sucked into the compressor, which is controlled such that the larger the cooling capacity, the larger ΔP. Accordingly, $X_m-X_i$ is automatically adjusted according to a required cooling capacity. At this time, $X_m-X_i$ is the same as δ. Accordingly, the larger the required cooling capacity, the larger the stroke.

Here, δ with respect to the DC component in Math Figure 4 will be defined as follows:

MathFigure 4

$$\delta(=x_m-x_i)=\frac{\Delta P \cdot A_s}{k}=G(k, A_s, \Delta P) \qquad [\text{Math. 4}]$$

As described above, if $\delta_1$ has a value of $\alpha_2(1+\beta)-2\alpha_1+\delta_2$, the same effect as the adjustment of the stroke of the piston by asymmetrically applying a voltage in the conventional art can be provided. Accordingly, even if a symmetrical voltage is applied to the coil section (14a of FIG. 1), the same effect as an increase of the stroke of the piston by applying an asymmetrical voltage in the conventional art under an overload condition can be provided by decreasing the elastic coefficient $k_m$ of the mechanical spring and increasing the shift δ of the piston.

Under the overload condition, the cooling capacity $Q_e$ is expressed as follows:

MathFigure 5

$$Q_e=\dot{m} \cdot \Delta h=\rho \cdot A_s \cdot \dot{x} \cdot \Delta h=\eta \cdot S \cdot f \qquad [\text{Math.5}]$$

wherein η is a proportional constant, S is a stroke, and f is an operation frequency.

There is a need that the larger the required cooling capacity, the larger the length of the stroke. Thus, under the entire cooling capacity condition, the stroke should be larger than the maximum value with which the piston can reciprocate. That is, it is preferable that the stroke required to provide the maximum flow rate of the reciprocating compressor is smaller than the sum of two times the initial value and the distance that the piston is shifted due to the flow rate of the refrigerant. To satisfy this condition, the following Math Figure should be met.

MathFigure 6

$$S=\frac{Q_{max}}{\eta \cdot f} \leq (2 \cdot \alpha + G(k_m, A_s, \Delta P)) \qquad [\text{Math. 6}]$$

Hereinafter, Math Figure 6 will be referred to as a maximum cooling capacity condition which is a required cooling capacity condition under the maximum load condition. Here, $G(k_m, A_s, \Delta P)$ is δ which is the distance the piston is shifted.

Figure 4:
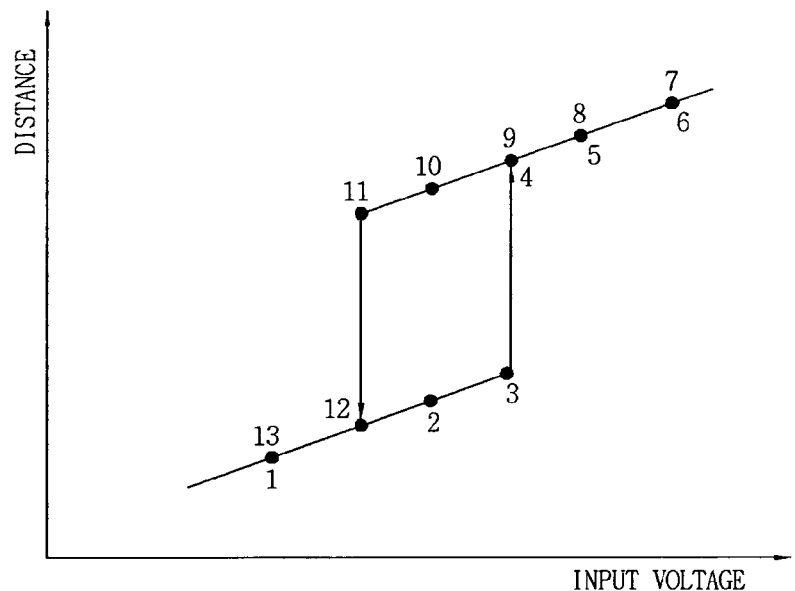
FIG. 4 is a view for explaining the displacement of the piston according to a change in input voltage.

Referring to FIG. 4, as described above, $A_s \times \Delta P / k_m$ is satisfied, $\eta$ a proportional constant, S is a stroke, and f is an operation frequency. $Q_{max}$ denotes a maximum cooling capacity. Satisfying Math Figure 6 means that the stroke S of the piston is changed by a change of a required cooling capacity in the reciprocating compressor, and a required flow rate is provided due to the changed stroke.

Figure 6:
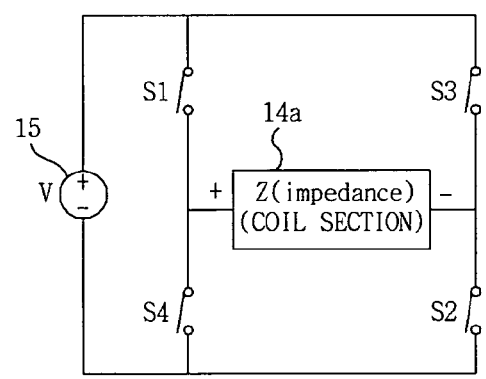
FIG. 6 is an example of a circuit diagram for operation by a mechanical resonance frequency.

Accordingly, there is a need to select an elastic coefficient $k_m$ of the mechanical spring and an initial value $x_i=\alpha$ of the piston that satisfy Math Figure 6. At this time, when the piston (6 of FIG. 1) is operated to reach the top dead center to make the head of the piston contact with one surface of the cylinder (4 of FIG. 1), it can be seen that the initial value Xi of the piston is equal to the movement distance $\alpha$ of the piston in one direction as a symmetrical voltage is applied to the coil section (14a of FIG. 1), with no external force applied. Accordingly, in Math Figure 6, when the elastic coefficient km of the mechanical spring and the initial value $\alpha$ of the piston are selected, the maximum stroke S of the piston under the overload condition is determined.

Meanwhile, since the efficiency is the highest when the operation is done in the resonance state, the operation frequency (f) should satisfy the same condition as that of the mechanical resonance frequency ($f_m$), i.e., $$f = f_m = \frac{1}{2\pi} \cdot \sqrt{\frac{k_m + k_g}{m}}.$$

Figure 5:
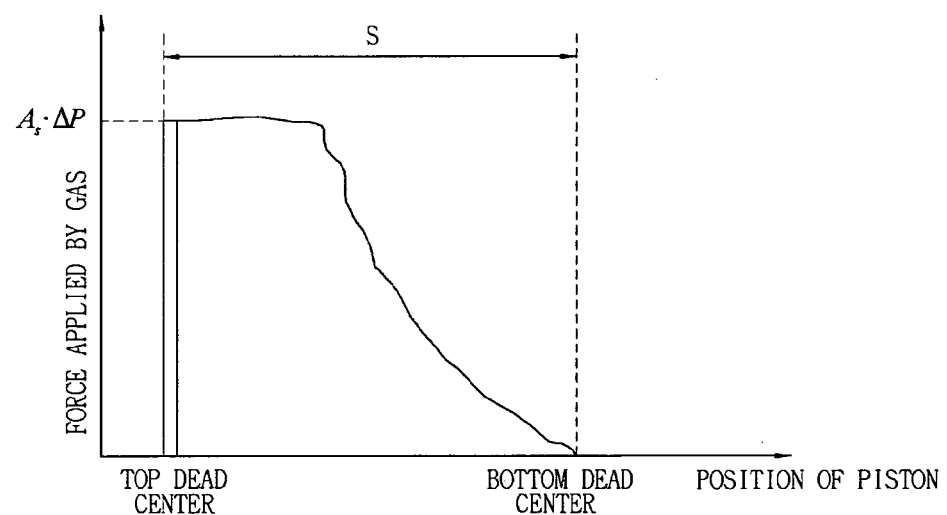
FIG. 5 is a view showing the force applied by gas according to the position of the piston.

Further, the operation frequency (f) should satisfy Qe=n·S·f which is the cooling capacity condition of an overload state stated in Math Figure 5. To satisfy all these conditions, the following Math Figure should be satisfied.

MathFigure 7

$$f = \frac{1}{2\pi} \sqrt{\frac{k_m + k_g}{m}} = \frac{Q_e}{\eta \cdot S} \quad \text{[Math. 7]}$$

That is, the operation frequency (f) is determined by the elastic coefficient (km) of the mechanical spring and the elastic coefficient (kg) of the gas spring, and the elastic coefficient (kg) of the gas spring is represented by considering the force applied by the refrigerant gas as a force applied by the mechanical spring. The obtaining of this will be described in detail below.

FIG. 4 is a view for explaining a displacement of the piston in accordance with a change in input voltage. A distance from the Y axis refers to a distance between one surface of the cylinder (4 of FIG. 1) constituting the compression space (P of FIG. 1) and the head of the piston (6 of FIG. 1). During the linear reciprocating motion of the piston (6 of FIG. 1), the point at which one surface of the cylinder (4 of FIG. 1) and the head of the piston (6 of FIG. 1) is the nearest is referred to as a top dead center position (or top dead center portion), and the point at which one surface of the cylinder (4 of FIG. 1) and the head of the piston (6 of FIG. 1) is the farthest is referred to as a bottom dead center position (or bottom dead center portion).

An operating state of the reciprocating compressor will be described with reference to FIGS. 1 to 4. The piston 6 gets far from and close to one surface of the cylinder 4, i.e., linearly reciprocates between the top dead center position and the bottom dead center position.

More specifically, as the voltage is changed as seen in the positions 1 to 3, the piston 6 gets gradually far from one surface of the cylinder 4 constituting the compression space P, and hence, the Y axis distance gets far. At this time, as shown in the position 3, when the piston 6 gets far enough from one surface of the cylinder 4 constituting the compression space P and a pressure inside the compression space P becomes below a predetermined discharge pressure, the discharge valve assembly 24 is closed. Afterwards, as the piston 6 gets abruptly far from one surface of the cylinder 4 constituting the compression space P as seen in the positions 3 and 4, with the compression space P being closed by the discharge valve assembly 24, the Y axis distance gets abruptly far.

Afterwards, as the voltage is changed as seen in the positions 4 to 11, the piston 6 gets gradually far from one surface of the cylinder 4 constituting the compression space P and then gets close thereto, and hence the Y axis distance gets the farthest and then gets close thereto. At this time, if a pressure inside the compression space P becomes below a predetermined suction voltage between the positions 4 and 6, the refrigerant is sucked into the compression space P in a state that the suction valve 22 is opened, and if a pressure inside the compression space P becomes over a predetermined suction voltage between the positions 7 and 11, the refrigerant is sucked into the compression space P in a state that the suction valve 22 is closed.

Further, as shown in the position 11, when the piston 6 gets close enough to one surface of the cylinder 4 constituting the compression space P and a pressure inside the compression space P becomes over a predetermined discharge pressure, the discharge valve assembly 24 is opened, and the refrigerant compressed in the compression space P is discharged to the outside. Afterwards, as the piston 6 gets abruptly close to one surface of the cylinder 4 constituting the compression space P as seen in the positions 11 and 12, with the compression space P being opened by the discharge valve assembly 24, the Y axis distance gets abruptly close. As the voltage is changed as seen in the positions 12 to 13, the piston 6 gets gradually close to one surface of the cylinder 4 constituting the compression space P, and hence, the Y axis distance gets the closest.

In this way, the refrigerant acts as the gas spring by its elastic force. That is, the force applied by the refrigerant gas becomes nonlinear due to the opening and closing of the discharge valve assembly 24. As a result, the distance between the piston and the cylinder 4 constituting the compression space P, i.e., the distance of the Y axis, is abruptly changed in some portions like the positions 3 to 4 and the positions 11 to 12. Such a jump phenomenon may cause a disturbance in obtaining the elastic coefficient ($k_g$) of the gas spring. A method for obtaining the elastic coefficient ($k_g$) of the gas spring will be described below.

FIG. 4 is a view showing the force applied by gas in accordance with the position of the piston. As the mechanical spring described above is comprised of coil springs, the elastic coefficient ($k_m$) of the mechanical spring is constant and the force applied to the compression space by the mechanical spring, i.e., the elasticity (F) of the mechanical spring, is generally proportional to a displacement (x) from the initial value of the piston. On the contrary, as the gas spring is comprised of a refrigerant gas, the elastic coefficient ($k_g$) of the gas spring is varied according to the conditions such as pressure and temperature, and the force applied to the compression space by the gas spring, i.e., the elasticity ($F_c(t)$) of the gas spring is nonlinearly changed. At this time, as shown in FIG. 5, the elasticity ($F_c(t)$) of the gas spring increases as it gets farther from the bottom dead center but does not increase at more than a predetermined value ($\Delta P \cdot A_s$). Therefore, the elastic coefficient ($k_g$) of the gas spring can be obtained by the nonlinear elasticity ($F_c(t)$) of the gas spring, but there is a need to employ a describing function method.

The describing function method is a method for equalization in order to analyze nonlinear control. When a specific waveform (for example, sine wave) is applied as an input signal, a specific waveform whose basic oscillation cycle is the cycle of a specific input waveform is outputted. By the way, the amplitude and phase thereof are different from the previous ones. Of this output, such a fundamental wave having the same cycle can be represented as a describing function by a difference in amplitude and phase.

The force $F_c(t)$ applied by the refrigerant gas is seen as the force applied by the gas spring by means of a describing function, and the elastic coefficient ($k_g$) of the gas spring is obtained by the following Math Figure:

MathFigure 8

$$k_g = \frac{4 \cdot f}{S} \int_0^{\frac{1}{f}} F_c(t) \cdot \sin(2\pi \cdot f \cdot t) \, dt \quad \text{[Math. 8]}$$

Figure 7:
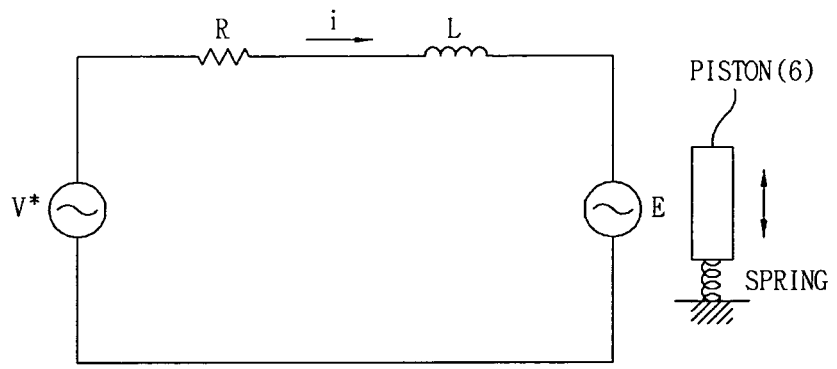
FIG. 7 is an equivalent circuit diagram in case where a reciprocating motor makes a model as an R-L circuit having a counter electromotive force.
Figure 8:
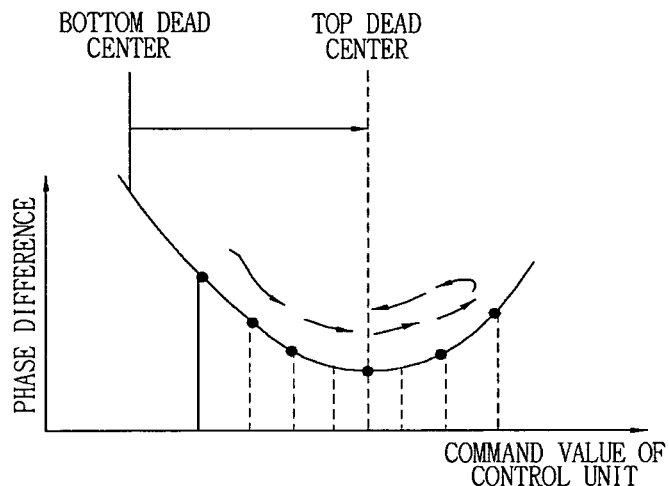
FIG. 8 is a view for explaining a method in which the control unit controls power so as to operate at a resonance frequency.

If Math Figure 8 representing the elastic coefficient of the gas spring is substituted into Math Figure 7 representing the operation frequency satisfying an overload cooling capacity condition in the resonance state as described above, the following Math Figure is established.

MathFigure 9

$$f = \frac{1}{2\pi} \sqrt{\frac{k_m + \frac{4f}{S} \int_0^{\frac{1}{f}} F_c(t) \cdot \sin(2\pi \cdot f \cdot t) \, dt}{m}} = \frac{Q_e}{\eta \cdot S} \quad \text{[Math. 9]}$$

wherein the elastic coefficient ($K_g$) of the gas spring is a value that is changed with time. Thus, the resonance frequency (fm) varied according to the elastic coefficient ($k_g$) of the gas spring is also changed with time. At this time, in order to satisfy the condition that the efficiency is the highest in the resonance state, the operation frequency (f) is made consistent with the resonance frequency ($f_m$). The control unit controls a power applied to the coil section (14a of FIG. 1) so that the operation frequency can be synchronized or locked with the resonance frequency ($f_m$) varied with time.

FIG. 6 is an example of a circuit diagram for operation by using the operation frequency of the reciprocating compressor as a resonance frequency. In order to operate at the operation frequency (f) stated in Math Figure 9, the power applied to the coil section (14a of FIG. 1) needs to be controlled. The control unit (not shown) controls the power applied to the coil section 14a (identical to the coil section of FIG. 1), and preferably includes inverter units S1 to S4.

Specifically, controlling in a full bridge manner in the inverter circuit will be described. A DC power source 15 having a voltage of V is controlled by the inverter units S1 to S4 to supply power to the coil section 14a. At this time, the inverter units S1 to S4 receive a power or voltage from the DC power source 15, and applies an AC voltage having a desired frequency and amplitude to the coil section 14a according to a command value (drive). Especially, when the elastic coefficient of the mechanical spring and the initial value ($\alpha$) of the piston $$S = \frac{Q_{max}}{\eta \cdot f} \leq (2 \cdot \alpha + G(k_m, A_s, \Delta P))$$

that satisfy Math Figure 6 are selected, the operation frequency (f) satisfying Math Figure 9:

$$f = \frac{1}{2\pi} \sqrt{\frac{k_m + \frac{4f}{S} \int_0^{\frac{1}{f}} F_c(t) \cdot \sin(2\pi \cdot f \cdot t) \, dt}{m}} = \frac{Q_e}{\eta \cdot S}$$

is synchronized with the resonance frequency ($f_m$). The control unit controls the power applied to the coil section 14a so that the operation frequency (f) can be synchronized or locked with the resonance frequency ($f_m$) variable according to time.

Of course, the reciprocating compressor of the present invention employs the linear motor (10 of FIG. 1), and the elastic coefficient ($k_m$) and the elastic coefficient ($k_g$) of the gas spring are determined as constant values ($K_m$, $K_g$) under the load considered at the time of design of the linear motor (10 of FIG. 1). Therefore, the reciprocating compressor of the present invention can increase efficiency by resonance by controlling the operation frequency (f) so as to be consistent with the resonance frequency (fm) calculated by the constant ($K_m$) of the mechanical spring and the constant ($K_g$) of the gas spring, which is preferable.

By the way, in the reciprocating compressor of the present invention, a load is actually varied, the elastic coefficient ($k_g$) of the gas spring, which is the refrigerant gas, and the resonance frequency ($f_m$) calculated in consideration of the elastic coefficient ($k_g$) of the gas spring are changed. Therefore, in the reciprocating compressor, it is preferable that the frequency or operation frequency (f) of the power applied to the coil section (14a of FIG. 1) are changed according to the resonance frequency ($f_m$) varied according to load.

In other words, in a cooling system, such as a refrigerator, employing the reciprocating compressor of the present invention, a maximum cooling capacity is determined according to a load condition at the time of design, and in the reciprocating compressor of the present invention, when the stroke (S) and operation frequency (f) of the piston corresponding to the maximum cooling capacity are determined, a map representing the stroke (S) and operation frequency (f) of the piston according to a required cooling capacity is properly created and inputted. Accordingly, the compressor of the present invention is operated with the stroke (S) and operation frequency (f) of the piston set based on this map according to the load condition of the cooling system, and is operated to reach the top dead center in the resonance state by adjusting the operation frequency (f) so that a phase inversion to be described later may occur during operation. Of course, the operation frequency (f) of the reciprocating compressor increases relatively as the low load condition turns into the high load condition. Also, as the low load condition turns into the high load condition, the shift increases, thereby mechanically increasing the stroke S of the piston, too A method for controlling the operation frequency (f) so as to be synchronized with the resonance frequency ($f_m$) to perform a resonance operation in the reciprocating compressor of the present invention will be described below. In an oscillation system, controlling can be done so that the operation frequency (f) can be synchronized with the resonance frequency ($f_m$) by a phenomenon occurring to the resonance frequency ($f_m$) according to the degree of freedom.

Typically, while, in an oscillation system having one degree of freedom, the phase abruptly changes at a resonance frequency, in an oscillation system having two degrees of freedom, increase and decrease in phase are inversed. However, in the reciprocating compressor of the present invention, both the cylinder (4 of FIG. 1) and the piston (6 of FIG. 1) are not fixed, but supported by a shell (2 of FIG. 1) by an elastic member, such as a spring. Thus, the reciprocating compressor of the present invention is an oscillation system having two degrees of freedom. In such a system having two degrees of freedom, the piston (6 of FIG. 1) linearly reciprocates as a power is applied to the coil section (14a of FIG. 1). The position x of the piston linearly reciprocating and an electric charge Q or a current i, which is a differential value of the electric charge, becomes variables, and has two resonance frequencies.

Accordingly, the reciprocating compressor of this invention is a system having two degrees of freedom. As power is applied, starting from a low operation frequency to a high frequency, a phase inversion occurs at a resonance frequency as follows. More specifically, if the operation frequency is lower than the smaller one (hereinafter, first resonance frequency) of two resonance frequencies, the phases of the two variables (the position x of the piston and the current i) have no specific correlation with each other. On the other hand, even if the operation frequency is smaller than the first resonance frequency, if it is close to the first resonance frequency, the difference between the phases of (the position x of the piston and the current i) decreases. Further, if the operation frequency becomes larger than the first resonance frequency, the difference between the position x of the piston and the current i becomes larger again. That is, in the reciprocating compressor of the present invention, which is an oscillation system having two degrees of freedom, the phenomenon in which the increase and decrease of the difference between the position x of the piston and the current i is inversed at the first resonance frequency is referred to as a phase inversion.

The above-described phase inversion is observed most clearly when the head of the piston (6 of FIG. 1) in the reciprocating compressor comes into contact with one surface of the cylinder (4 of FIG. 1) constituting the compression space (P of FIG. 1), that is, at the top head center position. Therefore, in the reciprocating compressor of the present invention, if controlling is done so that the difference in phase between the two variables (the position x of the piston and the current i) is the smallest, this means that the operation frequency is controlled at a mechanical resonance frequency (fm), and if controlling is done so that the phase inversion occurring to the mechanical resonance frequency (fm) may be most clearly observed, this means the piston (6 of FIG. 1) is controlled to be operated at the top head center. At this time, as power is applied to the coil section (14a of FIG. 1), an electromagnetic force is generated between an inner stator (12 of FIG. 1) and an outer stator (14 of FIG. 1). A permanent magnet (16 of FIG. 1) is linearly reciprocated by an interactive electromagnetic force between the inner stator (12 of FIG. 1) and the outer stator (14 of FIG. 1), and the piston (6 of FIG. 1) connected to the permanent magnet (16 of FIG. 1) is also linearly reciprocated. Thus, as the piston (6 of FIG. 1) is linearly reciprocated, a counter electromotive force is generated. For the convenience of control, controlling can be done by a counter electromotive force (E), rather than by the position x. That is, in the reciprocating compressor of the present invention, the position where the difference in phase between the current i and the counter electromotive force E is found, and this enables the above-described controlling, which will be described in detail below.

FIG. 7 is an equivalent circuit diagram in case where a reciprocating motor makes a model as an R-L circuit having a counter electromotive force. In this equivalent circuit diagram, a theoretical basis for representing the movement of the piston can be expressed by the following differential equation:

$$E = V^* - Ri - L\frac{di}{dt}.$$

Here, R represents an equivalent resistance, L represents an equivalent inductance coefficient, i represents a current flowing through the motor, and V* represents a voltage command value corresponding to an output voltage from an inverter unit. The aforementioned variables are all measurable, so that a counter electromotive force E can be calculated.

In addition, the theoretical basis of the motion of the piston 6 is explained by a mechanical motion equation such as the following Math Figure:

$$m\frac{d^2x}{dt^2} + C\frac{dx}{dt} + kx = ai.$$

Here, and x represents a displacement of the piston 6, m represents a mass of the piston 6, C represents a damping coefficient, k represents an equivalent spring constant, and α represents a counter electromotive force constant. The mechanical equation obtained by transforming the above Math Figure into a complex number type is defined as the following Math Figure $$E = \frac{a^2}{C + \left(m\omega - \frac{k}{\omega}\right)j}i.$$

Here, ω represents a number of oscillations.

Accordingly, as explained above, since the reciprocating compressor according to the present invention is an oscillation system having two degrees of freedom, when the phase difference between the current i and the counter electromotive force E is the smallest, that is, zero, a resonance phenomenon may occur, thereby maximizing efficiency. In theory, when the complex number part of the denominator in the Math Figure:

$$E = \frac{a^2}{C + \left(m\omega - \frac{k}{\omega}\right)j}i$$

is zero, the phase difference between the current i and the counter electromotive force E is the smallest, thereby causing a resonance phenomenon.

However, as described above, the equivalent spring constant k is obtained by adding up the mechanical spring constant $K_m$ and the gas spring constant $K_g$, and thus varied by the load. Thus, even if the load is changed, it is possible to detect the position at which the phase difference between the current i and the counter electromotive force E is the smallest by varying the operation frequency (f), and track the resonance frequency ($f_m$) varied according to load by maintaining the operation frequency (f) at this position. This will be described in more detail below.

FIG. 8 is a view for explaining a method in which the control unit controls power so as to operate at a resonance frequency. The X axis indicates the operation frequency and amplitude of voltage Vm applied to the coil section (14a of FIG. 1), which are command values controlled by the control unit, and the Y axis actually indicates the above-described phase difference between the back electromotive force E and the current i. At this time, a y value, which is the phase difference between the back electromotive force E and the current i, is changed according to an x value, which is the operation frequency of voltage Vm applied to the coil section (14a of FIG. 1). As described above, the x value represents the same resonance state as the resonance frequency ($f_m$) at the position where the y value is the smallest.

In more detail, a control method for synchronizing the operation frequency (f) with the resonance frequency ($f_m$) will be described. An inverter unit generates a sine wave voltage according to a voltage command value V*. First, a control method of the linear motor (10 of FIG. 1) detects a voltage command value V* and a current i, and accordingly detects a counter electromotive force E. Afterwards, the control unit of the linear motor (10 of FIG. 1) detects a phase of the current i, and then obtains a phase difference between the current i and the counter electromotive force E by comparing the phases of the counter electromotive force E and the input current i. Thereafter, as shown in FIG. 8, the control unit of the linear motor (10 of FIG. 1) repetitively performs the process of obtaining a frequency change value (Δf) for decreasing the y value, which is the phase difference between the current i and the counter electromotive force E, that is, for equalizing the phase of the current i and the phase of the counter electromotive force E, generating such a frequency change value (Δf), and correcting the voltage command value V*, so that controlling can be done such that the y value is the smallest and a phase inversion is clearly observed.

Such a control method is to control such that the operation frequency (f) can be synchronized or locked with the mechanical resonance frequency (fm), and the top dead center of the piston (6 of FIG. 1) can reach one surface of the cylinder (4 of FIG. 1). If the control unit makes the top dead center reach one surface of the cylinder (4 of FIG. 1), this is referred to as the detection of the top dead center. If the detection of the top dead center is possible, efficiency is improved. Accordingly, it is possible for the reciprocating compressor of the present invention to control the piston (6 of FIG. 1) to be operated to reach the top dead center (hereinafter, top dead center motion) in the compression procedure.

As discussed earlier, in accordance with the present invention, in the method for controlling the reciprocating compressor, the resonance state is achieved by using the variables (R, L, i, V*) measurable in the electrical model obtained by equalizing the mechanical oscillation system, instead of estimating the mechanical resonance frequency (fm) by accurately calculating the spring constant K that is a mechanical variable obtained by adding up the elastic coefficient ($K_m$) of the mechanical spring and the elastic coefficient ($k_g$) of the gas spring, and the operation frequency (f) is adjusted so that a phase inversion may occur in the resonance state. Thus, it is possible to increase efficiency by easily performing a top dead center operation in the resonance state. Therefore, the reciprocating compressor can be designed such that it is not sensitive to structural precision during the production so as to perform a resonance operation. As a result, structural errors during the process for fabricating the reciprocating compressor can be easily overcome.

Although the present invention has been explained in detail on the basis of the preferred embodiments and accompanying drawings, it is to be understood that the present invention is not limited to the above-mentioned embodiments and drawings but the scope of this invention should be limited only by the following claims.

The invention claimed is:

1. A reciprocating compressor, comprising:
a closed vessel;
a cylinder installed inside the closed vessel;
a linear motor that linearly reciprocates a piston;
a controller that applies a symmetrical voltage to the linear motor;
a gas spring that elastically supports the piston in a motion direction by a refrigerant gas filled inside the closed vessel; and
a mechanical spring that elastically supports the piston in the mourn direction, the mechanical spring having an elastic coefficient that allows the piston to perform both a top dead center operation and a resonance operation even if a load condition varies, wherein the elastic coefficient of the mechanical spring and an initial position of the piston are set in accordance with a maximum load condition, and wherein a stroke length of the piston required to provide a maximum flow rate is two times larger than a distance of the initial position of the piston from a center point and is equal to or smaller than a sum of two times the distance of the initial position of the piston from the center point and a distance that the piston is shifted due to a flow rate of a refrigerant, and therefore the stroke of the piston is maximum under the maximum load condition.

2. The reciprocating compressor of claim 1, wherein the elastic coefficient of the mechanical spring is set so that the piston symmetrically reciprocates with respect to the center point in consideration of a degree of shift of the piston in accordance with the load condition.

3. The reciprocating compressor of claim 1, wherein the initial position of the piston is set so that the piston symmetrically reciprocates with respect to the center point in accordance of a degree of shift of the piston in accordance with the load condition.

4. The reciprocating compressor of claim 1, wherein the controller adjusts an operation frequency (f) and an input voltage (V) so that a difference between a phase of a back electromotive force (E) and a phase of current (i) varied according to a position of the piston (x) is a minimum.

5. The reciprocating compressor of claim 1, wherein a map representing a stroke (S) of the piston and an operation frequency (f) is set in accordance with a required cooling capacity determined according to the load condition and the controller applies a voltage so that the piston operates with the stroke (S) and operation frequency (f) in accordance with the required cooling capacity based on the map.

6. The reciprocating compressor of claim 1, wherein the controller controls the voltage so that an operation frequency (f) is synchronized or locked with a resonance frequency (fm) that varies with time.

7. A reciprocating compressor, comprising:
a closed vessel;
a cylinder installed inside the closed vessel;
a linear motor that linearly reciprocates a piston;
a controller that applies a symmetrical voltage to the linear motor;

a gas spring that elastically supports the piston in a motion direction by a refrigerant gas filled inside the closed vessel; and a mechanical spring that elastically supports the piston in the motion direction, the mechanical spring having an elastic coefficient corresponding to a degree of shift of the piston that allows the piston to perform a symmetrical reciprocating motion with respect to a center point even if a load condition varies, wherein the elastic coefficient of the mechanical spring and an initial position of the piston are set in accordance with a maximum load condition, wherein a stroke length of the piston required to provide a maximum flow rate is two times larger than a distance of the initial position of the piston from a center point and is equal to or smaller than a sum of two times the distance of the initial position of the piston from the center point and a distance that the piston is shifted due to a flow rate of a refrigerant, and therefore the stroke of the piston is maximum under the maximum load condition.

8. The reciprocating compressor of claim 7, wherein the initial position of the piston is set to have an amplitude to maintain a stroke of the piston so as to correspond to a required cooling capacity condition of the reciprocating compressor.

9. The reciprocating compressor of claim 7, wherein the initial position of the piston and a stroke of the piston are set in consideration of a degree of shift of the piston under a maximum cooling capacity condition.

10. The reciprocating compressor of claim 7, wherein the controller performs a resonance operation of the piston at an operation frequency corresponding to a required cooling capacity condition of the reciprocating compressor and a stroke of the piston.

11. The reciprocating compressor of claim 7, wherein the controller moves the piston at a top dead center.

12. The reciprocating compressor of claim 11, wherein the controller adjusts an operation frequency (f) and an input voltage (V) so that a difference between a phase of a back electromotive force (E) and a phase of current (i) varied according to a position of the piston (x) is a minimum.

13. The reciprocating compressor of claim 11, wherein a map representing a stroke (S) of the piston and an operation frequency (f) is set in accordance with a required cooling capacity determined according to the load condition and the controller applies a voltage so that the piston operates with the stroke (S) and operation frequency (f) in accordance with the required cooling capacity based on the map.

14. The reciprocating compressor of claim 7, wherein the controller controls the voltage so that an operation frequency (f) is synchronized or locked with a resonance frequency (fm) that varies with time.

* * * * *